United States Patent [19]

Kundis

[11] Patent Number: 5,022,344

[45] Date of Patent: Jun. 11, 1991

[54] METHOD AND APPARATUS FOR APPLYING PARTICULATE MATTER TO A CABLE CORE

[75] Inventor: Dieter E. Kundis, Hickory, N.C.

[73] Assignee: Siecor Corporation, Hickory, N.C.

[21] Appl. No.: 322,343

[22] Filed: Mar. 13, 1989

[51] Int. Cl.⁵ .......................... B05C 5/00; B05C 19/00
[52] U.S. Cl. ...................................... 118/56; 118/63; 118/303; 118/308; 118/326
[58] Field of Search ............... 118/308, 310, 311, 325, 118/417, 418, 326, 56, 63, 303

[56] References Cited

U.S. PATENT DOCUMENTS

| | | | |
|---|---|---|---|
| 2,703,550 | 3/1955 | Bell | 118/309 X |
| 3,270,364 | 10/1966 | Steele | 118/63 |
| 3,516,388 | 6/1970 | Barnes | 118/326 X |
| 4,263,871 | 4/1981 | Gibson | 118/310 |
| 4,334,494 | 6/1982 | Kane | 118/63 |
| 4,401,366 | 8/1983 | Hope | 350/96.23 |
| 4,419,157 | 12/1983 | Ferrentino | 156/56 |
| 4,512,827 | 4/1985 | Gill | 156/48 |

OTHER PUBLICATIONS

Warbrick, "Chalkmaster", pp. 1-22, Technical Specifications, Explanation, Diagrams, relative to UK Patent No. 2055632B.

Primary Examiner—David A. Simmons
Assistant Examiner—Robert Barker
Attorney, Agent, or Firm—Roy B. Moffitt

[57] ABSTRACT

A method of applying particulate matter to a cable core comprising providing first and second chambers, both of which have entrance and exit ports, the first chamber containing particulate matter and the exit port of the second chamber containing an air wipe which includes a cable core passageway in communication with the interior and exterior of the second chamber and at least one air passageway which is in communication with the cable core passageway and has an elongated longitudinal axis disposed at an acute angle to the longitudinal axis of the cable core passageway so that gas flowing through such a passageway is directed into the second chamber; passing a cable core through the first chamber and applying particulate matter to it to form a coated core; passing the coated core through the second chamber and said air wipe; and, forcing a gas through the air passageway in the air wipe onto the coated core to remove a predetermined amount of particulate matter from the coated core and transmit same into the interior of the second chamber.

6 Claims, 4 Drawing Sheets

PRIOR ART

METHOD AND APPARATUS FOR APPLYING PARTICULATE MATTER TO A CABLE CORE

BACKGROUND OF THE INVENTION

This invention relates to both method and apparatus for applying particulate matter to a cable core, such being applicable equally to telecommunications as well as power cable. The cable core can be composed of electrical energy conducting materials, such as copper or aluminum, or glass fibers for conducting light energy, all of which are referred to in this disclosure as "conductors", irrespective of whether they are intended to conduct light or electrical energy.

The prior art recognizes the desirability of applying to cable cores powdered hydrophylic materials adapted to swell (increase its volume) upon coming in contact with water. See U.S. Pat. No. 4,002,809 incorporated herein by reference. Such powder performs two functions: (a) absorbs water that enters the cable; and (b) forms a blocking mechanism to the further entry of water into the cable. Discussion of the desirability of such a water blocking agent in a cable is set forth in U.S. Pat. Nos. 4,100,002, 4,419,157, 4,525,026 and 4,297,624, incorporated herein by reference, for further background.

SUMMARY OF THE INVENTION

As a preferred embodiment, this invention has particular application to water swellable elements used to block the passage of water through a cable if the cable should be cut. This aspect is particularly important in ship and underwater operations, where water type bulkheads are used to seal the undamaged portions of the vessel from a section of the vessel which has been damaged. It also has particular applications to buried fiber optic cable that comes in constant contact with ground water. It is important to allow communications cable to remain operational after water has entered the cable. This goal would be compromised if water could seep through communications cable from the damaged portion of the vessel or underground cable to the undamaged portion. Therefore, one of the objects of the invention is to longitudinally water block a cable, so that such water seepage cannot take place.

One example, a preferred embodiment, of the invention employs a fiber optic cable sub-unit composed of an optical fiber with an outer coating of polyester circumscribed by a plastic outer jacket. Aramid yarn impregnated or coated with a water swellable powder, acrylic acid powder for example, is disposed between the coated optical fiber and the outer jacket. Dusting the yarn with a swellable powder in advance is a useful method of making such a sub-unit. Applicant has found that whenever there is an application of water swellable (hydrophylic) powders of particulate matter to cable core there are certain problems. Some of these problems are recognized in U.S. Pat. No. 4,419,157, incorporated herein by reference. One problem that is not believed to be recognized by the prior art is that water swellable particulate matter applied to a cable core results in a coated cable core with an irregular surface, i.e., it is not concentric or smooth. See FIG. 2 of this disclosure for example. The particulate matter coating usually achieved is bumpy and has numerous irregularities that do not recommend it to subsequent jacketing of the core in a quality manner. This gives rise to the problem of how to shape particulate matter forming the coating on the cable core without disturbing the main body of the particulate matter coating to impair its integrity and simultaneously keep the particulate matter contained so that it does not escape to the atmosphere outside of the applying apparatus. Applicant has found that these problem can be solved by passing the cable core through first and second chambers and then through an airwipe that has air passages that direct air and particulate matter removed from a coated cable core to the interior of the second chamber. In the first chamber, which is a rotating chamber, particulate matter is disposed on the bare cable core. Emerging from the first chamber is a coated cable core that is irregular in its surface and not readily adapted to further jacketing operations in a quality manner. See FIG. 2 of this disclosure. Applicant has found that by passing the coated cable core through a second chamber and an air wipe, this problem can be solved. By providing air passageways in the air wipe that are disposed at an acute angle to the longitudinal axis of the cable core passageway of the air wipe, particulate matter can be confined to the second chamber.

The exit port of the first chamber is coaxially aligned with the entrance and exit ports of the second chamber. The exit port of the second chamber contains an air wipe comprised of a cable core passageway that communicates with the interior and exterior of the second chamber and a plurality of air passageways that communicate with the cable core passage way and lie at an acute angle as above described. Connected to the air passageways is a source of compressed gas, whose pressure can be controlled. Using this apparatus, a number of streams of gas (usually air) pass through the air passageway, impinge upon the surface of the particulate matter coated cable core, remove any excess particulate matter from the coated cable core, form a concentric smooth surface particulate matter cable core, and transmit the excess particulate matter to the interior of the second chamber.

After the cable core has been coated and passed through the air wipe, it is then passed to an operation where a cable core wrap or jacket or both are applied to the coated cable core in a conventional well known prior art manner. See U.S. Pat. No. 4,419,157 for prior art teachings of coating a coated cable core.

Applicant is familiar with a prior art mechanism sold under the trademark Chalkmaster, made by the Warbrick Engineering of Cheshire, England. This apparatus employes a fluidized bed as a powder applicator for cables, wires, hose, tubes, and profiles and the advertisement for this mechanism states that U.K. Patent 2055632B is applicable. Applicant has found that this one chamber prior art mechanism is expressly adapted for the application of "chalk" (calcium carbonate) to an elongated member such as a cable core. When hydrophylic powder is used in this apparatus, instead of chalk, moisture in the air crosses the water swellable powder to conglomerate, to compact. This causes the amount of non-compacted powder to decrease in volume, coating is decreased and this causes the operator to feed more air into the fluidized bed of the Chalkmaster applicator to increase the supply of particulate matter, resulting in almost constant and unwanted adjustments in air feed as the humidity impacts the particle size distribution of the particulate matter. An air wipe is used by this prior art device; however, air is fed in a stream that is essentially perpendicular to the longitudinal axis of a cable core and particulate matter coated thereon. As a result, particulate matter is blown not only back into the single chamber where the fluidized bed is disposed, but to the outside surroundings as well. Such is dangerous, especially when using hydrophylic powders. An operator breathing such powder all day is exposing himself to unnecessary risks. It is to the solution of these two problems that this invention is directed.

DETAILED DESCRIPTION OF THE INVENTION

Figure 1:
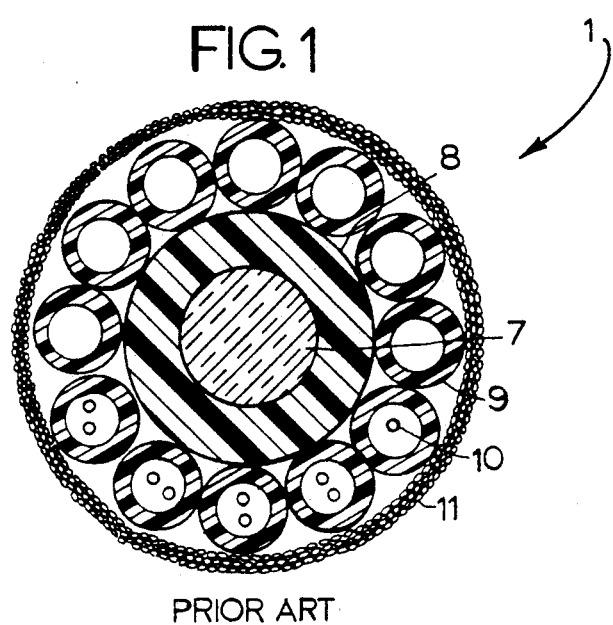
FIG. 1 is a cross section of a cable core prior to it being coated with particulate matter.

Shown in FIG. 1 as element 1 is a conventional fiber optic cable core, having a central strength member 7 circumscribed by a plastic jacket 8 and a plurality of buffer tubes 9, in which there is disposed optical fibers 10. The buffer tubes are disposed around jacket 8 and circumscribing the buffer tubes 9 is aramid fibers 11. Element 1 is prior art cable core of conventional design. Optical fibers 10, buffer tubes 9 can obviously be replaced with insulated or electrical conductors (not shown) in a manner well known to the prior art.

Figure 2:
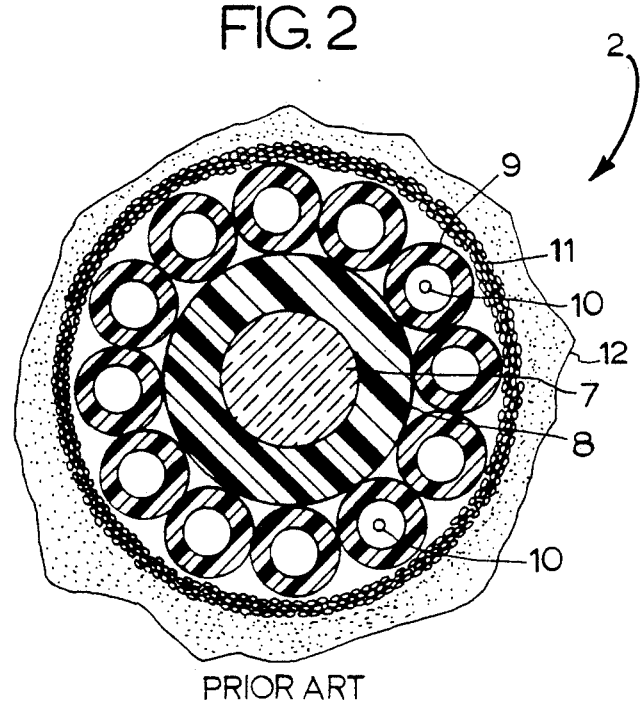
FIG. 2 is the cable core of FIG. 1 coated with particulate matter.

Shown as element 2 in FIG. 2 is the prior art cable core 1 of FIG. 1 coated with particulate matter 12. Element 2 is the element that is created by passing cable core 1 through chamber 13 and into chamber 14 of FIG. 5 as will be more fully explained at a later time. The prior art coated cable core of FIG. 2 is irregular in shape because of the uneven application of the particulate matter.

Figure 3:
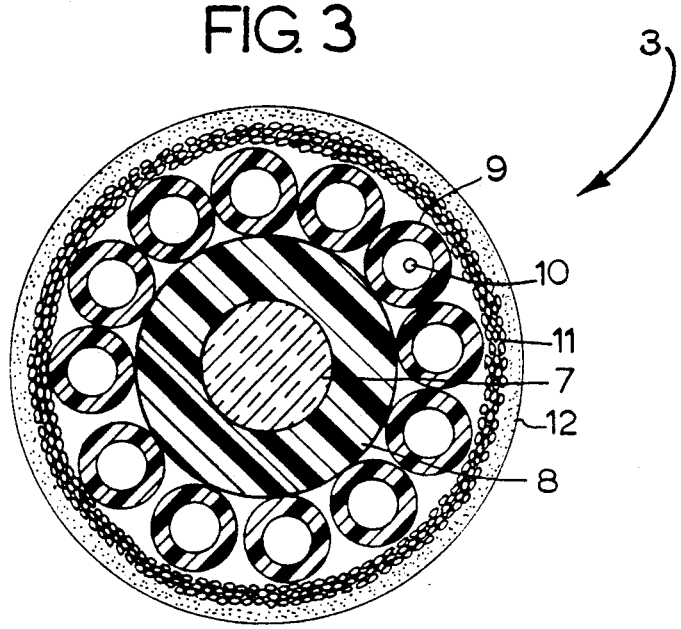
FIG. 3 is the coated cable core of FIG. 2 after being passed through the air wipe of the invention.
Figure 4:
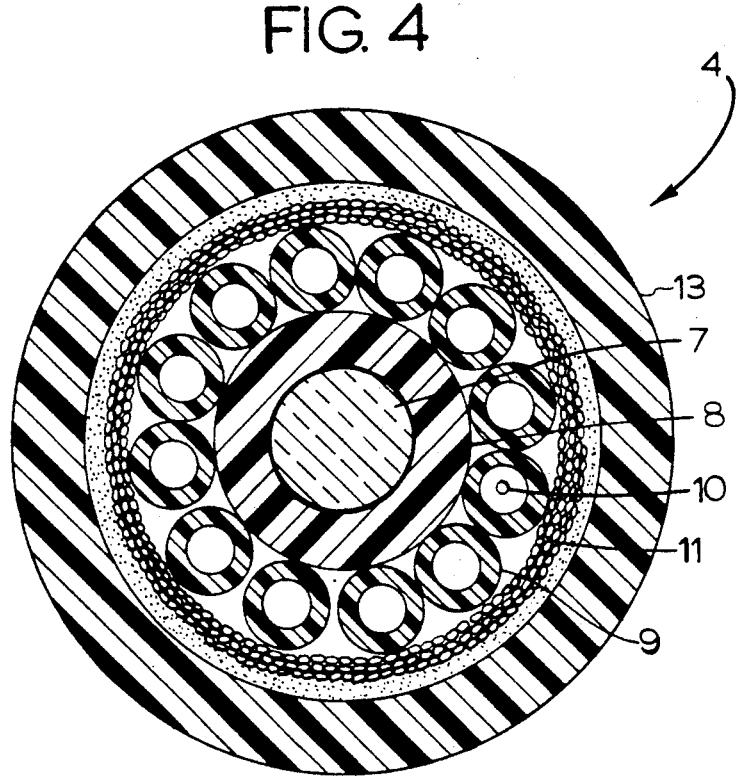
FIG. 4 is the coated cable core of FIG. 3 circumscribed by a jacket.

Shown in FIG. 3 by element 3 is a cable core coated using the herein disclosed invention. It will be noted that the coating of particulate matter 12 is concentric and does not contain any irregularities as shown by element 12 of FIG. 2. Element 3 is the product of the herein disclosed method using the apparatus shown in FIG. 5, as it emerges from cable core passageway 21 of air wipe 6. Using conventional extrusion apparatus (not shown) element 3 of FIG. 3 is made into a finished cable 4 by applying jacket 13 over particulate matter 12.

Figure 5:
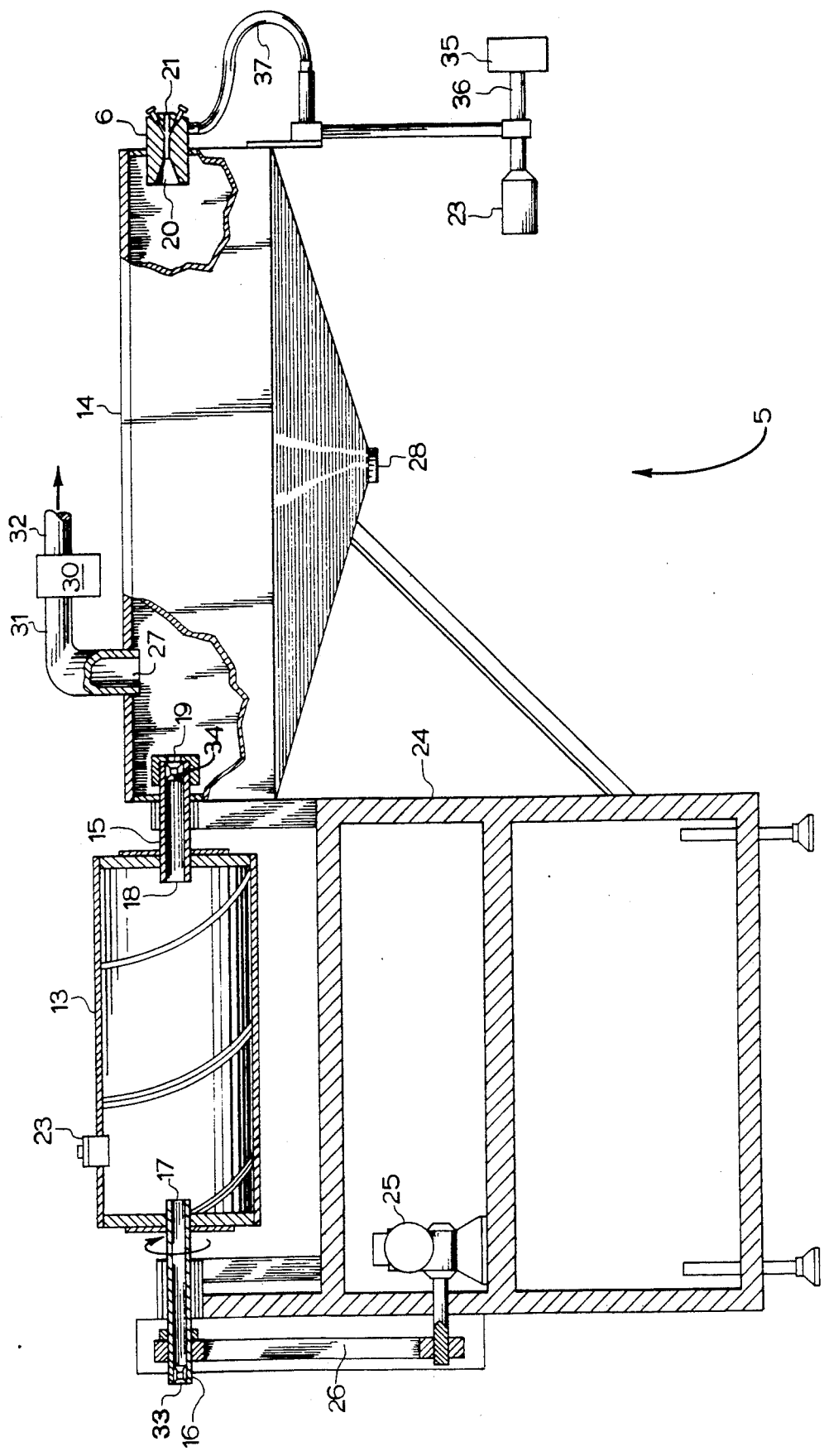
FIG. 5 is a side elevation of a partial cross section of the apparatus used to make the coated cable core of FIG. 3.
Figure 6:
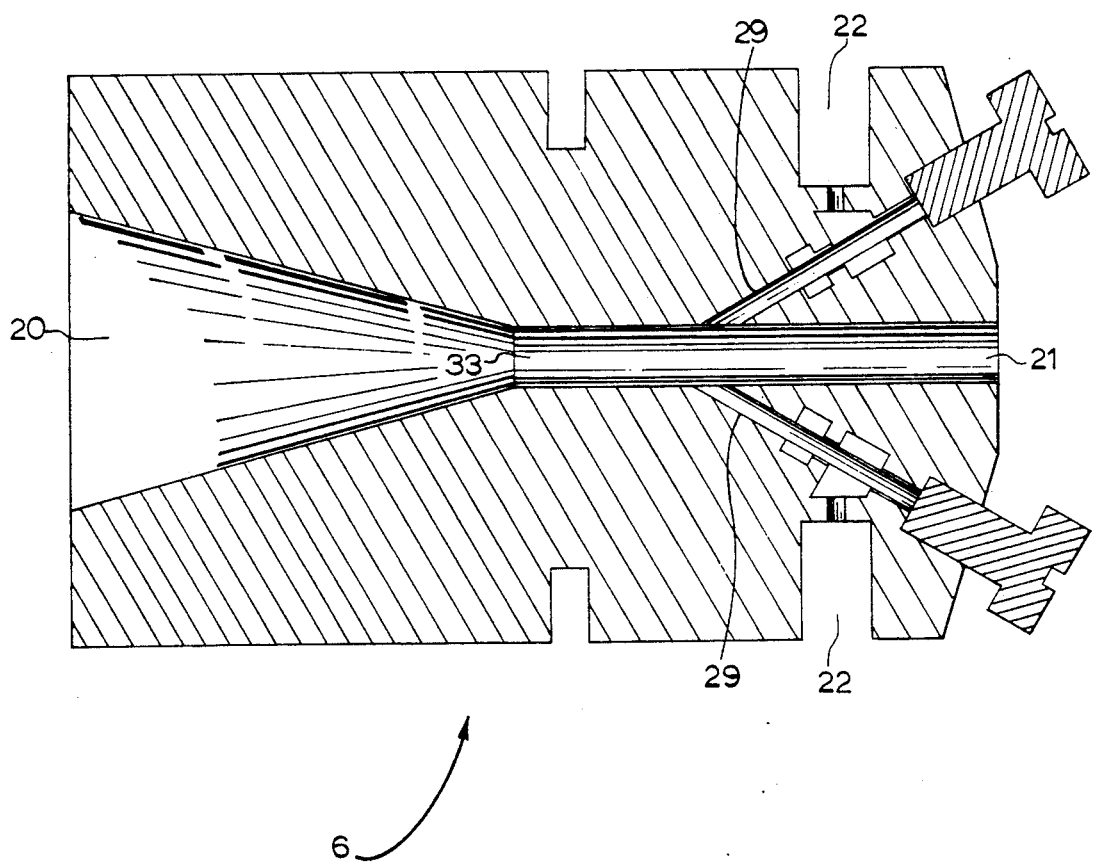
FIG. 6 is a cross section of the air wipe portion of the apparatus shown in FIG. 5.

Turning now to FIG. 5, there is shown element 5, the apparatus used to make the coated able core 3 of FIG. 3. This apparatus comprises a frame 24, on which a first chamber 13 and second chamber 14 are disposed. First chamber 13 is rotatably mounted so that it rotates along its longitudinal axis and around dies 17 and 15. Motor 25, through drive mechanism 26, rotates first chamber 13. Particulate matter such as a carboxymethylcellulose, bentonite or acrylic acid powder are placed in first chamber 13. Another example is a powder made by Dow Chemical Company, U.S.A. of Midland, Mich., 48674, identified as XUS-40346.00L Developmental Powder. Such powders swell upon being brought into contact with water and are otherwise known as hydrophylic powders.

First chamber 13 has inlet and outlet ports 17 and 18 delimited by support members 16 and 15 respectively. Support members 15 and 16 support first chamber 13, which rotates about them. Element 23 represents means for ingress and egress into the interior of first chamber 13. Support member 16 circumscribes die 33. Support member 15 contains die 34. Anchoring means 19 is affixed to support member 15 to create a shoulder against which die 34 abuts so that it is kept in the position as shown. The cable core, as it exits from chamber 13 and enters support member 15 resembles element 2 but with a larger amount of particulate matter on top. Die 34 is used to remove this uppermost excess and trim the coated cable core to that approximating that shown by element 2 of FIG. 2. The excess then is pushed back into chamber 13. Second chamber 14 is not necessarily a rotatable chamber and has inlet port 19, defined by die 15 and exit port 21 as defined by airwipe 6. Second chamber 14 also has an additional port 27 through which excess particulate matter can be withdrawn by a vacuum, see element 30, as the coated cable core 2 travels through second chamber 14 and air wipe 6. Vacuum means 30 is connected to port 27 to ducts 31 and 32 and used to remove gas and particulate matter suspended in the gas, usually air. Element 23 represent-s a value for controlling a supply of compressed air or gas provided by element 35 and conduit 36. Such gas is connected by conduit 37 to air passageways 22 of airwipe 6 to provide a stream of air through passageway 22 into passageways 29 where it is allowed to impinge upon and carve or sculpt the particulate matter 12 of FIG. 2. Such carving or sculpting results in particulate matter 12 of FIG. 3, a concentric layer of particulate matter rather than an irregular layer of particulate matter as shown by the same element in FIG. 2.

Air passageways 29 have an longitudinal axis disposed at an acute angle to the longitudinal axis of cable core passageway 33 so that air or gas forced through passageway 29 is forced through passageway 33 and into second chamber 14, where the particulate matter is either confined in second chamber 14 or is removed by vacuum means 30 and duct work elements 31 and 32. In this manner, the atmosphere surrounding the apparatus for coating a cable core is essentially free of particulate matter.

In practice, prior art cable core 1 is threaded into die 16 and enters into the interior of first chamber 13 through port 17. Particulate matter in first chamber 13 is then applied to cable core 1 by the rotation of first chamber 13 and particulate matter therein. This process results in a particulate coated cable core like that shown in element 2 of FIG. 2. Element 2 is then traversed through port 18, die 15 and through port 19 into second chamber 14, thence into port 20 and cable core passageway 21, where one or more streams of air or compressed gas is directed at particulate matter 12 of FIG. 2 to sculpt or carve same into the concentric configuration shown by element 12 of FIG. 3. Coated cable core 3 of FIG. 3 emerges from port 21 and airwipe 6 to be later processed into a finished cable by placing a jacket 13 thereon by conventional means (not shown). Port 28 is a means to access and remove any excess particulate matter accumulated in chamber 14. This can be done either by gravity or by vacuum means such as that shown by elements 27, 31, 30, and 32.

What is claimed is:

1. An apparatus for coating a cable core with particulate matter comprising first and second chambers each of which have entrance and exit coaxially-lined ports, said first chamber being rotatable, said exit port of said second chamber containing an air wipe comprised of a cable passageway having a longitudinal axis in communication with the interior and exterior of said second chamber, and a plurality of air passageways in communication with said cable passageway, said air passageways each having a longitudinal axis disposed at an acute angle to the cable passageway so that gas forced through said air passageways is forced into the second chamber.

2. The apparatus of claim 1 further including a die in communication with the exit port of the first chamber at the entrance of said second chamber.

3. The apparatus of claim 1 further including another port in the second chamber and a means attached thereto to remove gas and particulate matter therethrough from said second chamber.

4. The apparatus of claim 1 further including a source of gas connected to said air passageway adapted to force gas through said air passageways.

5. The apparatus of claim 1 further including a motor for rotating the first chamber.

6. Apparatus of claim 1 wherein said particulate matter is hydrophylic.

* * * * *

UNITED STATES PATENT AND TRADEMARK OFFICE
CERTIFICATE OF CORRECTION

PATENT NO.   :   5,022,344
DATED        :   June 11, 1991
INVENTOR(S)  :   Dieter E. Kundis It is certified that error appears in the above-identified patent and that said Letters Patent is hereby corrected as shown below:

In Column 5, Line 4, after the word "rotatable", insert the words -- with respect to said second chamber and containing a mass of particulate matter --

Signed and Sealed this

Twenty-fourth Day of November, 1992

Attest:

DOUGLAS B. COMER

*Attesting Officer*    *Acting Commissioner of Patents and Trademarks*